United States Patent

[11] 3,631,506

| [72] | Inventor | Watrons Alfred Nielsen<br>Chicago, Ill. |
|---|---|---|
| [21] | Appl. No. | 840,095 |
| [22] | Filed | June 9, 1969 |
| [45] | Patented | Dec. 28, 1971 |
| [73] | Assignee | Card Automatic Recording Data, Inc.<br>Chicago, Ill. |

[54] IMPRINTING UNIT FOR A DISPENSING DEVICE
10 Claims, 5 Drawing Figs.

[52] U.S. Cl. .................................................. 346/43,
235/92 C, 235/94 R, 346/98, 235/94 A
[51] Int. Cl. ............................................. B67d 5/24
[50] Field of Search........................................... 346/43, 61,
104, 91, 98, 145; 235/94 R, 94 A, 92 C, 91 M;
222/30

[56] References Cited
UNITED STATES PATENTS

| 2,254,661 | 9/1941 | Markley et al. ................ | 346/60 X |
| 3,103,878 | 9/1963 | Wetzer ......................... | 235/92 X |
| 3,214,763 | 10/1965 | Davis ............................ | 346/43 |

*Primary Examiner*—Joseph W. Hartary
*Attorney*—Petherbridge, O'Neill & Lindgren ABSTRACT: A billing card imprinting device for a dispensing unit. The device includes a plurality of side-by-side imprinting discs, each disk having a solenoid and linkage drive means for rotating the disk in correspondence with the dispensing unit.

INVENTOR
Watrous Alfred Nielson
BY Petherbridge O'Neill + Aubel
ATT'Y.

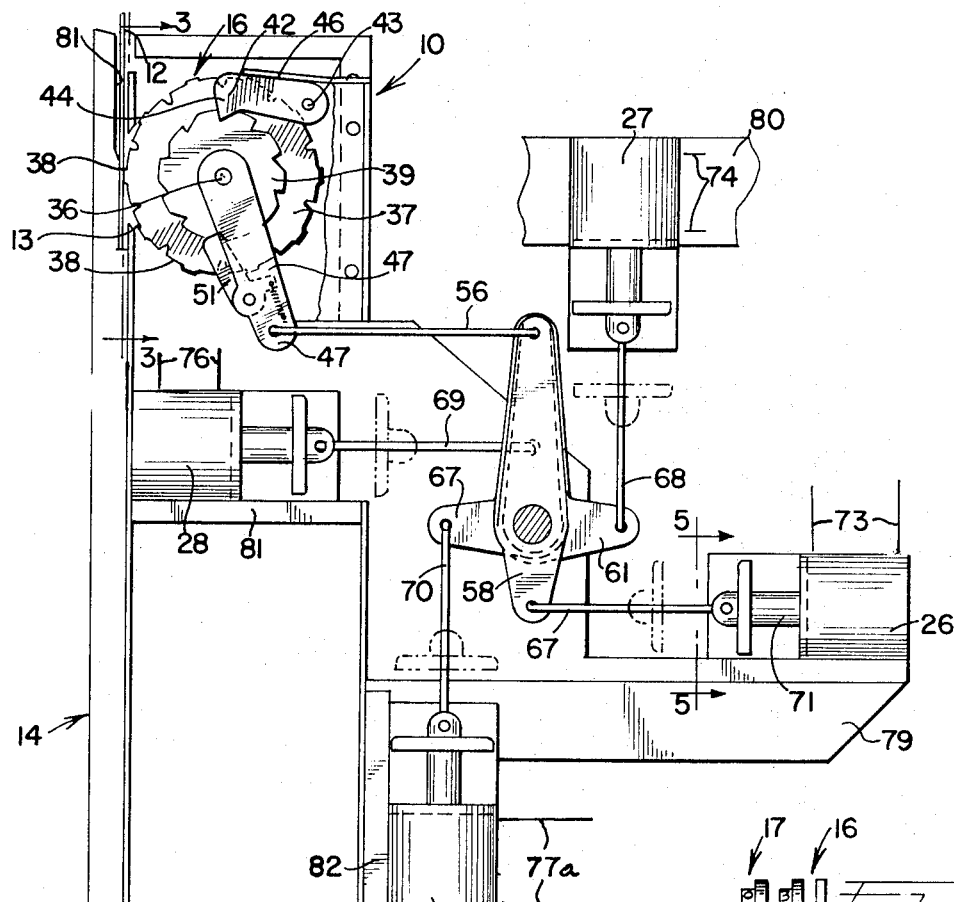
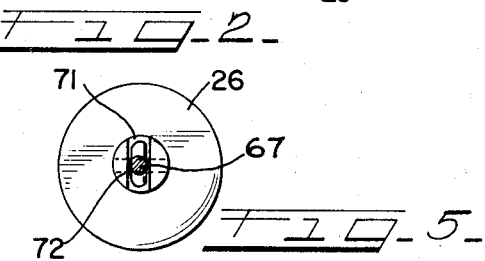
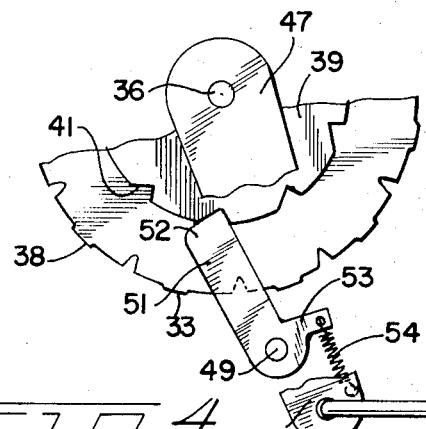
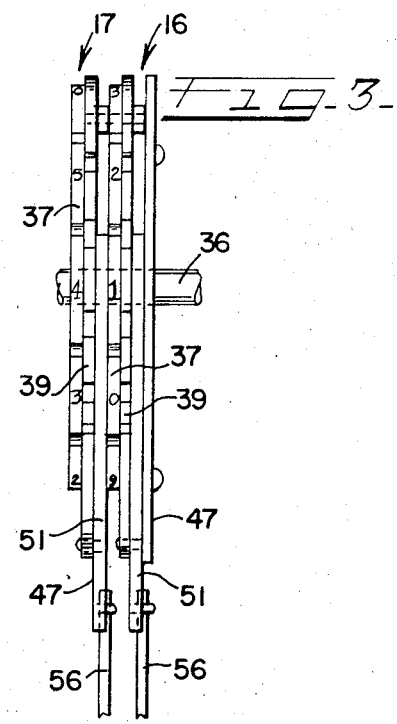

IMPRINTING UNIT FOR A DISPENSING DEVICE

The present invention relates to imprinting devices and more particularly to an imprinting device for use in dispensing or vending units for automatically recording the data of the transaction on a billing card.

The imprinting device is primarily intended, but not limited, for use in dispensing or vending units in which the sale is consumated by a credit card. The dispensing unit may be of the attendant operated or self-service type. Such units generally have means incorporated therein for computing the nature and sum of the transaction on a visual indicator incorporated in the units. This is then recorded on a billing card which forms the basis on which the consumer will ultimately be billed in the usual manner.

The vending units may also have provisions for visually indicating the nature and sum of the transaction. The visual recording means are mechanically operated and of the rotary or wheel type having indicia in the form of letters, numerals or other characters angularly disposed about the periphery of the wheels. An example of visual computing means is the sum and quantity indicator or computer found in the typical gasoline pump.

The typical fuel pump includes two sets of correlated computers of which one set computes the sum and the other the quantity of gasoline dispensed. These computers are automatically set as the gasoline is dispensed.

In other types of vending units associated with credit card sales it may be necessary to manually set the computer to effect the dispensing of the article. Generally, the manner in which the computing is achieved is dependent on the state of the commodity dispensed. For example, if the commodity is fluid such as gasoline or granular the computing is automatically achieved by measuring the quantity of the flow. In dispensing single bulk commodities items such as candy, cigarettes, and the like the dispensing unit generally requires the mechanical setting of the price to effect the dispensing thereof.

The visual computed sum and other data is required to imprint by suitable means on to a credit slip. The billing slip may be in the form of a data processing card for use in computerized billing systems. As is well known such data processing cards are of a fixed sized so that the space allotted for imprinting the data is limited thereby. This restricts the size of imprinting device which may be used in these credit card associated vending machines.

A further consideration limiting the size of the imprinting device is the design consideration of the vending machine itself. The vending machines are generally designed to provide a maximum product dispensing capacity with a minimum of volume alloted to the operating mechanism. Accordingly only a small space is available for an imprinting mechanism.

By the present invention it is proposed to provide an imprinting mechanism for a vending machine associated with a credit card sale wherein the imprinting mechanism is constructed and arranged to occupy a minimum space within the housing of the unit.

It is a further object to provide an imprinting mechanism for a vending machine wherein the imprinting mechanism is automatically actuated and set by the computer mechanism of the vending machine.

It is another object to provide an imprinting mechanism of the foregoing type which is constructed and arranged to maintain a minimum spacing between the imprinting characters.

It is still another object taken in conjunction with the foregoing objects to provide an imprinting mechanism including solenoids which are used to motivate the imprinting means to a position corresponding to the data appearing to the data appearing on the computer of the vending machine.

Generally the foregoing objects are accomplished by providing a dispensing unit with an imprinting mechanism for recording data on a billing card and including a plurality of solenoid actuated imprinting subassemblies bearing indicia which are automatically set to correspond to indicia controlled by the vending machine.

More specifically, the imprinting mechanisms includes a plurality of rotatably mounted imprinting subassemblies in side-by-side relationship. The subassemblies are equal to the number of side-by-side indicia set in the vending machine and include a pawl and ratchet drive operated by associated solenoids which are connected to respective ones of the pawl and ratchet drive by linkage means. The solenoids are arranged so as to maintain a substantially linear relationship between the respective solenoid shaft and pawl and ratchet drives. The solenoids are energized by means actuated upon the changing of the indicia in the vending machines whereby the imprinting subassemblies are automatically set to imprint a corresponding indicia.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 2 is an elevational view of the imprinting mechanism;

FIG. 3 is a fragmentary sectional view of the imprinting subassemblies taken generally along the lines 3—3 of Figure 2 and showing only two of the four imprinting subassemblies for clarity;

FIG. 4 is an enlarged fragmentary view of one of the imprinting subassemblies with some of the parts being broken away to show underlying details of structure; and FIG. 5 is a cross-sectional view taken generally along the lines 5—5 of Figure 2 and showing a typical connection of the drive linkage to the solenoid armature shaft.

Figure 1:
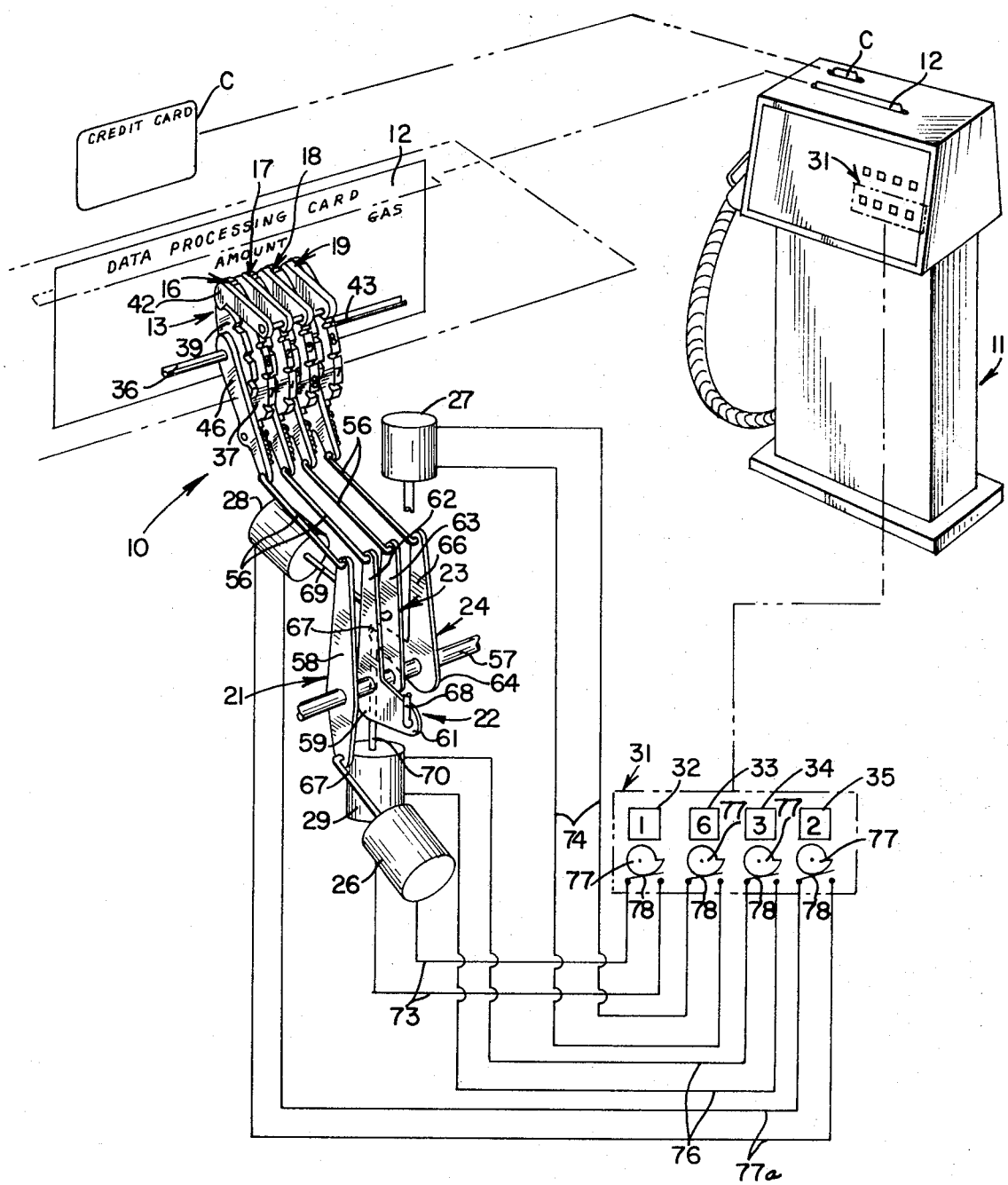
FIG. 1 is a schematic perspective view of a gasoline dispensing unit having an imprinting device embodying the structure of the present invention.

Referring now to the drawings, in particular Figure 1 there is schematically illustrated an imprinting device 10 incorporated into a gasoline dispensing unit pump 11 for automatically recording the quantity and the amount of sale on a billing card 12. The pump 11 may be of the attendant operated or self service type. In an attendant operated pump the data from a credit card C may be imprinted on the billing card manually by a device which is separate from or incorporated into the pump housing. The billing card is then positioned in the pump housing for imprinting by the imprinting device 11 for recording the quantity and sum of the sale.

In the self-operated type of pump the credit card may be used to initiate the operation of the gasoline dispensing unit by insertion into the pump. At this time the credit card data embossed on the face may be imprinted on the billing card by suitable means not shown. The billing card may remain in the same position or be transferred by suitable means for alignment with the imprinting device 10 for recording the transaction of the pump computer.

As illustrated, the imprinting device 10 is shown associated with the computer which records the sum and the total quantity of gasoline dispensed during the transaction. For the purpose of clarity in describing the invention only the means for imprinting the sum of the transaction is illustrated and the structure and the means for imprinting the gallons dispensed has been eliminated. It should be understood that the means for imprinting the gallons is of identical structure and functions similarly to the sum imprinting means hereinafter described. Moreover, while the imprinting device is described in association with a gasoline dispensing unit, it should also be readily apparent the imprinting device 10 may be incorporated into any number of vending units for dispensing different commodities or articles.

Generally the imprinting device 10 comprises a frame 14 which is fastened within the housing of the pump 11. Rotatably supported on the housing 11 are a set 13 of four imprinting subassemblies 16, 17, 18 and 19. Each of the subassemblies 16, 17, 18 and 19 are connected by means of mechanical linkage subassemblies 21, 22, 23 and 24, respectively, to respective solenoids 26, 27, 28 and 29. The solenoids 21, 22, 23 and 24 are associated with a computer 31 conventionally incorporated in the pump to indicate the sum of the sale.

The computer 31 may be of the conventional Veeder-Root type which totals the sum as the gasoline is dispensed and includes four discs 32, 33, 34 and 36 of which the two left indicate the dollar sales in units and tens and the two right the cents sales in tenths and hundredths. Thus the number of imprinting subassemblies corresponds to the number of places appearing on the computer.

As shown the imprinting subassemblies 16, 17, 18 and 19 are each rotatably mounted on a common shaft 36 supported by the frame 14. The subassemblies 16, 17 18 and 19 are each of identical structure and include an imprinting wheel or disk 37 having its peripheral edge circumferentially divided into ten equal increments each bearing a raised numeral 38 with said numerals ranging in numerical progression from 0–9 and corresponding to the numerals appearing on the computer dials 32, 33, 34 and 35.

Fixed to the right face of the imprinting disk so as to be rotatable therewith is a ratchet wheel 39. The ratchet wheel 39 is formed with ten drive notches 41 so as to correspond to the number of raised digits on the imprinting disk 37. Engageable with one of the ratchet notches 41 so as to correspond is a pawl 42 which is suitably pivotally supported at one end by a pin 43 supported on brackets (not shown for purpose of clarity) fixed to the frame 14. The pawl 42 is formed with a nose 44 which engages within the notches 41 so as to permit only counterclockwise rotation of the imprinting disk 37 as viewed in Figure 2 and thereby prevents clockwise rotation. Resiliently biasing the nose 44 into the notch 41 is a leaf spring 46 which is fixed to the frame 14 at one end and overlies the upper edge of the pawl 42.

Disposed in face-to-face engagement with the ratchet but rotatably independent thereof is a drive lever 47. The drive lever 47 extends radially beyond the periphery of the imprinting disk 37 and is formed with an ear 48 to which there is pivotally attached by means of a pin 49 a drive pawl 51. The drive pawl 51 is formed with a nose 52 which engages with the ratchet notches 41 to rotate the latter counterclockwise upon turning of the drive lever 47 clockwise. Fixed to an arm 53 on the pawl 51 is one end of a spring 54 of which the other end is attached to the drive lever 47. The spring 54 serves to maintain the pawl nose 52 in engagement with the notches 41 as more fully to be explained hereinafter.

Connected to the ends of the drive levers 47 is one end of links 56 of the mechanical linkage subassembly 21. The mechanical linkage subassembly 21 includes a shaft 57 on which there is rotatably supported crank arm 58, bellcrank 59 having arms 61 and 62, crank arms 63, and bellcrank 64 having arms 66 and 67. As shown the bellcranks 59 and 64 are of identical construction but are disposed on the shaft 57 so that the horizontal arms 61 and 67 extend in opposite directions. The crank arms 58 and 63 may also be of similar construction; however as illustrated the downwardly depending portion of the arm 63 has been eliminated.

As shown the crank arm 58, bell crank 59, crank arm 63, and bellcrank 64 are associated with and connected to the imprinting subassemblies 16, 17, 18 and 19, respectively, by the links 56 and are also associated with the respective solenoids 26, 27, 28 and 29 by means of links 67, 68, 69 and 70 respectively. The link 67 is connected to the depending leg of crank arm 58; the link 68 to the bellcrank arm 27; link 69 intermediate the end of the crank arm 63; and the link 70 to the bellcrank arm 67.

As shown in Figure 5 the links 67, 68, 69 and 70 are each connected to the solenoid shafts 21 by means of a clevis connection 72. This type of connection makes it possible to transmit the motion from the solenoids to the links along a common axis. Moreover the clevis connection 72 permits free and uninterrupted movement of the solenoid shaft so as to eliminate sticking upon actuation thereof and permits a guided positive release thereby also increasing the serviceable life of the solenoid.

The solenoids 26, 27, 28 and 29 are each of identical structure and linearly or reciprocably movable between the full line position shown in Figure 2 upon energization of the associated circuits 73, 74, 75 and 76. The circuits 73, 74, 75 and 76 are each associated with the four dials 32, 33, 34 and 35 of the computer 31 so that upon complete rotation of the dials, cams 77 rotatable therewith are operative to close switches 78 included in each of the circuits. In this manner when anyone of the computer dials 32, 33, 34 and 35 of the computer 31 so that upon complete rotation of the dials, cams 77 rotatable therewith are operative to close switches 78 included in each of the circuits. In this manner when anyone of the computer dials 32, 33, 34 and 35 completes a rotation so that another digit appears in the window the cam 77 is operative to close the switch 78 and thereby energize the associated circuit so as to cause the associated solenoid to be linear movable to the phantom position.

As shown the solenoids are of substantially greater diameter than the spacing between the imprinting subassemblies so that if placed in side-by-side relationship the minimum length of the imprinting device would be dictated by the space occupied by the solenoids. This is not a desirable condition because of the space limitations dictated by the construction of the vending unit. Moreover, it is obvious that the linkage and drive mechanisms between the solenoids and imprinting subassemblies would have to be bent into various directions so that a direct linear drive relationship is not maintained in the manner shown in the Figures.

To maintain the minimum space and direct drive relationship, the solenoids 26, 27, 28 and 29 are disposed in a staggered quadrant relationship about the shaft 57 of the mechanical linkage subassembly 21. The solenoids 26, 27, 28 and 29 are supported in this relationship by suitable platforms or supports 79, 80, 81 and 82 incorporated into the frame 14. It is to be noted that the solenoids are spaced from each other sufficiently so that there is no interference during movement of the components thereof or the other members of the imprinting device.

Assuming now that the tens digit in the computer 31 has changed so that the cam 77 closes the switch 78. This causes the circuit 73 to be energized so that the solenoid shaft is moved to the phantom line position causing crank arm 58 connected thereto by the link 67 to be turned clockwise about the shaft 57. At the same time the link 56 connected to the upper end of crank arm 58 and to the drive arm 47 causes the latter to be turned counterclockwise about the shaft 36. As the drive arm 47 turns, the pawl 51 in engagement with a notch 41 of the ratchet wheel 39 causes rotation thereof along with the imprinting disk 37. The rotation of the ratchet 39 and imprinting disk 37 causes another digit to appear in alignment with a slot 81 in which the billing or data card is inserted. When the switch 78 is again opened so that the circuit 73 is deenergized, the solenoid returns to the full line position. This causes all of the linkages associated therewith to return to the original position shown. During the return, the drive pawl 51 turns counterclockwise against the force of the spring 54 until the nose again seats within a notch 41. At the same time the antibacklash pawl 42 remains seated within a notch 41 so that the ratchet 39 and imprinting wheel 37 fixed thereto are prevented from rotating clockwise as the drive pawl returns to its normal position.

The remaining imprinting subassemblies 17, 18, and 19 are similarly actuated upon changing of the digits in the computer digits 33, 34, and 35 so that a further description is not believed necessary. It is of course understood that the digits appearing on the imprinting subassemblies aligned in the slot will correspond to those appearing in the computer.

After the computer has stopped its operation so that the imprinting device is set to indicate a sum corresponding to the computer the billing card 12 is aligned and the sum imprinted thereon. A suitable ink transfer means (not shown) such as a ribbon is disposed between the face of the card and the printing disk so that the digit characters are transferred and imprinted thereon. The card may be supported by means, not shown, so as to transfer the characters through the ribbon by impact.

What is claimed is:

1. A billing card imprinting device for a dispensing unit having a computer for totaling the sums of a transaction, said imprinting device comprising a frame, a plurality of side-by-side imprinting discs rotatably mounted on said frame and having indicia formed on the periphery thereof corresponding to indicia on said computer, mechanical drive means for rotating said discs so that the indicia imprinted on a billing card corresponds to the indicia on said computer, and solenoids mounted in a staggered quadrant relationship each including a reciprocating shaft movable between a drive position and a normal static position connected to associated ones of said drive means, and means connecting said solenoids to said computer so that the solenoids are energized to reciprocate to said drive position upon changing of the indicia on said computer and thereby to drive said mechanical drive means and rotate said imprinting discs to correspondingly change the indicia of the latter.

2. The invention as defined in claim 1 wherein said imprinting discs are rotatable about a common shaft mounted on said frame, and wherein said mechanical drive means includes ratchet wheels fixed to associated ones of said imprinting wheels and a driving pawl for turning said ratchet and thereby said imprinting to change the indicia.

3. The invention as defined in claim 2 wherein said pawl of each of said drive is mounted on a drive arm rotatable about said common shaft independently of said imprinting disks and wherein mechanical drive means includes lever means disposed between and connected to associated ones of said drive arm means and said solenoids.

4. A billing card imprinting device for a dispensing unit having a computer for totaling the sums of a transaction, said imprinting device comprising a frame, a plurality of side-by-side imprinting discs rotatably mounted on said frame and having indicia formed on the periphery thereof corresponding to indicia on said computer, mechanical drive means for rotating said discs so that the indicia imprinted on a billing card corresponds to the indicia on said computer, said imprinting discs are rotatable about a common shaft mounted on said frame, said mechanical drive means includes ratchet wheels fixed to associated ones of said imprinting wheels and a driving pawl for turning said ratchet and thereby said imprinting discs to change the indicia, said pawl of each of said drive means is mounted on a drive arm rotatable about said common shaft independently of said imprinting discs and wherein mechanical drive means includes lever means disposed between and connected to associated ones of said drive arm means and solenoids, solenoids each including a reciprocating shaft movable between a drive position and a normal static position connected to associated ones of said drive means, said lever means are turnably mounted on a second common shaft and said solenoids are disposed in staggered quadrant relationship thereabout, and means connecting said solenoids to said computer so that said solenoids are energized to reciprocate to said drive position upon changing of the indicia on said computer and thereby to drive said mechanical drive means and rotate said imprinting discs to correspondingly change the indicia of the latter.

5. The invention as defined in claim 4 wherein at least one of said levers is a crank arm, and another of said levers is a bellcrank of which one arm thereof is connected to an associated one of said drive levers and the other arm to an associated solenoid.

6. The invention as defined in claim 5 wherein said solenoids associated with said crank arm and said bellcrank are positioned at about 90° relative to each other in separate quadrants.

7. The invention as defined in claim 4 wherein said imprinting device includes four imprinting disks and associated ratchet wheels, pawls and drive arms, and wherein said levers arms are equal in number to said imprinting disks and include two crank arms and two bellcranks arranged alternately on said second common shaft.

8. The invention as defined in claim 7 wherein said solenoids associated with said crank arms are disposed so that the axis of reciprocatives of said shafts lies in a horizontal plane, and solenoids associated with said bellcranks are disposed so that axis of reciprocations of said shaft lies in a vertical plane.

9. In a dispensing unit, a reception area within said unit for occupancy of a data bearing card, an imprinting device to which a preselected limited face portion of a data bearing card is exposed while said card occupies said reception area, said imprinting device including a series of disks of uniform diameter, a shaft on which said disks are centrally mounted for rotation in fixed axially spaced apart paths about an axis in spaced parallel relation to said face portion of said card occupying said reception area, each disk having its peripheral edge circumferentially divided into indicia bearing increments, each disk having individual drive means for rotating said disk to sequentially present said indicia bearing increments opposite said limited face portion of a data bearing card in said reception area, said drive means including a plurality of spaced apart solenoid units positioned in staggered angular relationship with respect to each other and a linkage system connecting each of said solenoid units to a disk with which said drive means is associated, said solenoid units and said linkage system having their lines of travel confined to an area bounded by planes parallel to the paths of rotation of said disks and spaced apart a distance substantially corresponding to the axial dimension of the area occupied by said disks.

10. The invention defined in claim 9 wherein means establishing said line of travel of said drive means includes a second shaft and said solenoid units occupy spaced-apart positions in staggered angular relationship about said shaft.

* * * * *